United States Patent
Lang et al.

(10) Patent No.: US 7,370,984 B2
(45) Date of Patent: *May 13, 2008

(54) REARVIEW MIRROR ASSEMBLY FOR MOTOR VEHICLES

(75) Inventors: Heinrich Lang, Ergersheim (DE); Wolfgang Seiboth, Bad Windssheim (DE); Stefan Centmayer, Ergersheim (DE)

(73) Assignee: Lang Mekra North America, LLC, Ridgeway, SC (US)

( * ) Notice: Subject to any disclaimer, the term of this patent is extended or adjusted under 35 U.S.C. 154(b) by 302 days.

This patent is subject to a terminal disclaimer.

(21) Appl. No.: 10/767,669

(22) Filed: Jan. 29, 2004

(65) Prior Publication Data

US 2004/0184172 A1 Sep. 23, 2004

Related U.S. Application Data

(63) Continuation of application No. 09/800,114, filed on Mar. 6, 2001, now Pat. No. 6,830,352.

(30) Foreign Application Priority Data

Dec. 22, 2000 (DE) .................... 100 64 647

(51) Int. Cl.
*G02B 7/182* (2006.01)
*B60R 1/06* (2006.01)

(52) U.S. Cl. ............ 359/871; 359/872; 359/877; 359/881; 248/475.1; 248/477

(58) Field of Classification Search ........... 359/871, 359/872, 877, 881; 248/475.1, 476, 477, 248/480

See application file for complete search history.

(56) References Cited

U.S. PATENT DOCUMENTS

| 3,384,334 | A | * | 5/1968 | Malachowski | 248/478 |
|---|---|---|---|---|---|
| 3,671,005 | A | * | 6/1972 | Schultz | 248/480 |
| 4,116,538 | A | * | 9/1978 | Oskam | 359/874 |
| 4,306,701 | A | | 12/1981 | Nierhaus et al. | |
| 4,701,037 | A | * | 10/1987 | Bramer | 359/874 |
| 4,877,214 | A | * | 10/1989 | Toshiaki et al. | 248/483 |
| 4,988,178 | A | * | 1/1991 | Eifert | 359/871 |
| 4,998,814 | A | * | 3/1991 | Perry | 359/871 |
| 5,031,871 | A | * | 7/1991 | Ohta et al. | 248/544 |
| 5,150,941 | A | * | 9/1992 | Silzer et al. | 296/152 |
| 5,245,480 | A | * | 9/1993 | Polzer | 359/841 |
| 5,483,385 | A | * | 1/1996 | Boddy | 359/841 |
| 5,583,703 | A | * | 12/1996 | Lang et al. | 359/877 |
| 5,621,577 | A | * | 4/1997 | Lang et al. | 359/872 |
| 5,671,996 | A | * | 9/1997 | Bos et al. | 362/488 |
| 5,687,035 | A | * | 11/1997 | Lang | 359/864 |
| 5,721,646 | A | * | 2/1998 | Catlin et al. | 359/865 |
| 5,760,980 | A | * | 6/1998 | Lang | 359/872 |
| 5,798,882 | A | * | 8/1998 | Lang | 359/872 |
| 5,889,627 | A | * | 3/1999 | Englander et al. | 359/864 |
| 5,903,402 | A | * | 5/1999 | Hoek | 359/841 |
| 6,032,323 | A | * | 3/2000 | Smith et al. | 15/250.3 |
| 6,059,419 | A | | 5/2000 | Englander et al. | |
| 6,170,957 | B1 | * | 1/2001 | Kaspar | 359/877 |

(Continued)

*Primary Examiner*—Ricky D. Shafer
(74) *Attorney, Agent, or Firm*—McNair Law Firm, P.A.

(57) ABSTRACT

A rearview mirror assembly for a vehicle is provided. The assembly has a holding component and clamping parts to clamp the mirror assembly to the holding component. Alternative embodiments of the holding component and clamping parts are also disclosed.

10 Claims, 6 Drawing Sheets

U.S. PATENT DOCUMENTS

| | | | |
|---|---|---|---|
| 6,520,653 B1 * | 2/2003 | Lang et al. | 359/871 |
| 6,702,449 B2 * | 3/2004 | Lang et al. | 359/871 |
| 6,830,352 B2 * | 12/2004 | Lang et al. | 359/872 |
| 2004/0114263 A1 * | 6/2004 | Lang et al. | 359/879 |

* cited by examiner

REARVIEW MIRROR ASSEMBLY FOR MOTOR VEHICLES

CROSS REFERENCE TO RELATED APPLICATION

This application is a continuation of application Ser. No. 09/800,114, filed Mar. 6, 2001, now U.S. Pat. No. 6,830,352 B2 issued Dec. 14, 2004.

FIELD OF THE INVENTION

The invention concerns a rearview mirror, especially for motor vehicles.

BACKGROUND OF THE INVENTION

DE 198 40 004 AI discloses a rearview mirror for motor vehicles in which a mirror support element is a carrier plate with a honeycomb structure. The mirror housing with the mirror framing, the mirror element with its pane, and the adjustment apparatus are fastened to the carrier plate. The carrier plate with the honeycomb structure is secured to a holder by means of a clamping mechanism and the holder, in turn, is attached to the body of the vehicle. A mirror of this type possesses a high degree of stability, a relatively low weight, and only a small tendency toward vibration.

A comparable mirror arrangement is described in EP 0 590 510 AI and DE 40 10 083, which each exhibit a carrier plate as the carrying element but without a honeycomb structure.

A disadvantage of this type of mirror arrangement is its comparatively heavy weight as found, for example, in the version of EP 0 590 510.

SUMMARY OF THE INVENTION

The present invention improves the lighter rearview mirror structure of DE 198 40 004 AI with the necessary stability.

In the present invention, the rearview mirror is secured to a holder in a known manner; i.e., a holding tube by means of a first and a second clamping component. The clamping bracket can be screwed to the mirror housing framing. Another possible fastening means is by riveting.

Since the first clamping part is the mirror housing framing and the second clamping part is the clamping bracket itself, onto which the mirror element is fastened, a carrier plate may be dispensed with. Removing the conventional carrier plate leads to a reduction in weight. Since the carrier plate is no longer required, the number of the system parts or components is reduced compared to the state of the technology, which results in a simpler mounting procedure and also reduces the costs of manufacture.

In accord with an advantageous embodiment of the present invention, the clamping bracket is made out of a more rugged material than the mirror housing framing.

Accordingly, the bracket becomes an important carrying component onto which the characteristic mirror pane is fastened along with a positioning apparatus. Since the entire extent of length or width of the mirror housing framing is available for the clamping connection, the clamping bracket can now be fashioned essentially in a large surface mode, so that it is possible to manufacture the clamping bracket from a reinforced plastic such as glass fiber reinforced plastic. Alternatively, the clamping bracket can naturally be made of metal.

In accord with a preferred embodiment of the invention, the clamping bracket fits into one side of the mirror framing with slip-in catches and is screwed into the mirror framing on the other side. This type of connection reduces the number of screwed connections and simplifies the mounting.

Following another advantageous embodiment of the invention, the mirror element includes a mirror pane, upon which a glass carrier plate is installed. The carrier plate is driven by a motor, preferably electric, for positioning adjustment. The positioning adjustment or apparatus and thereby the entire mirror element, are screwed onto the reinforced clamping bracket, which acts as the carrying element. This, too, contributes to simplifying the mounting.

In accord with yet another advantageous embodiment of the invention, a rimless glass carrier plate is employed, which allows the mirror pane to extend slightly beyond the glass carrier plate and the carrier plate. Thus, the glass carrier plate possesses no border or peripherally running rim which encloses the glass pane of the mirror. By dispensing with the enclosing rim for the glass carrier plate, with an outside design of the same dimensioning, optimum use is made of the glass area.

In accord with yet another advantageous embodiment of the invention, the mirror housing includes a mirror housing cover, which is releasably bound, or can be so bound, to the mirror housing framing by means of a snap-in connection. Since the mirror housing cover plate fulfills no carrying function, it may be manufactured with very thin walls and light in weight. By means of the snap-in connection, the cover plate can be easily disconnected and can also be lacquered in a simple manner with colors specified by the customer.

In a further advantageous embodiment of the invention, the clamping bracket, and/or the mirror framing in the area in which the holding part is located, engages securements in the form of projections or grooves in/on complementary, respective grooves or projections on the holding tube. In this way, not only is the slip-in clamping connection still available, but a form-fit connection to the holding part is also created.

In accord with yet another embodiment of the invention, the clamping bracket possesses an opening. By corresponding arrangement of the recess, when the mirror housing cover is removed, the adjustment apparatus is accessible through the opening. One advantage of this is that wiring to the position adjustment apparatus can be run through this opening.

BRIEF DESCRIPTION OF THE DRAWINGS

Further details, features and advantages of the invention arise from the following description of preferred embodiments with the aid of the drawings. There is shown in.

DETAILED DESCRIPTION OF THE INVENTION

Figure 1:
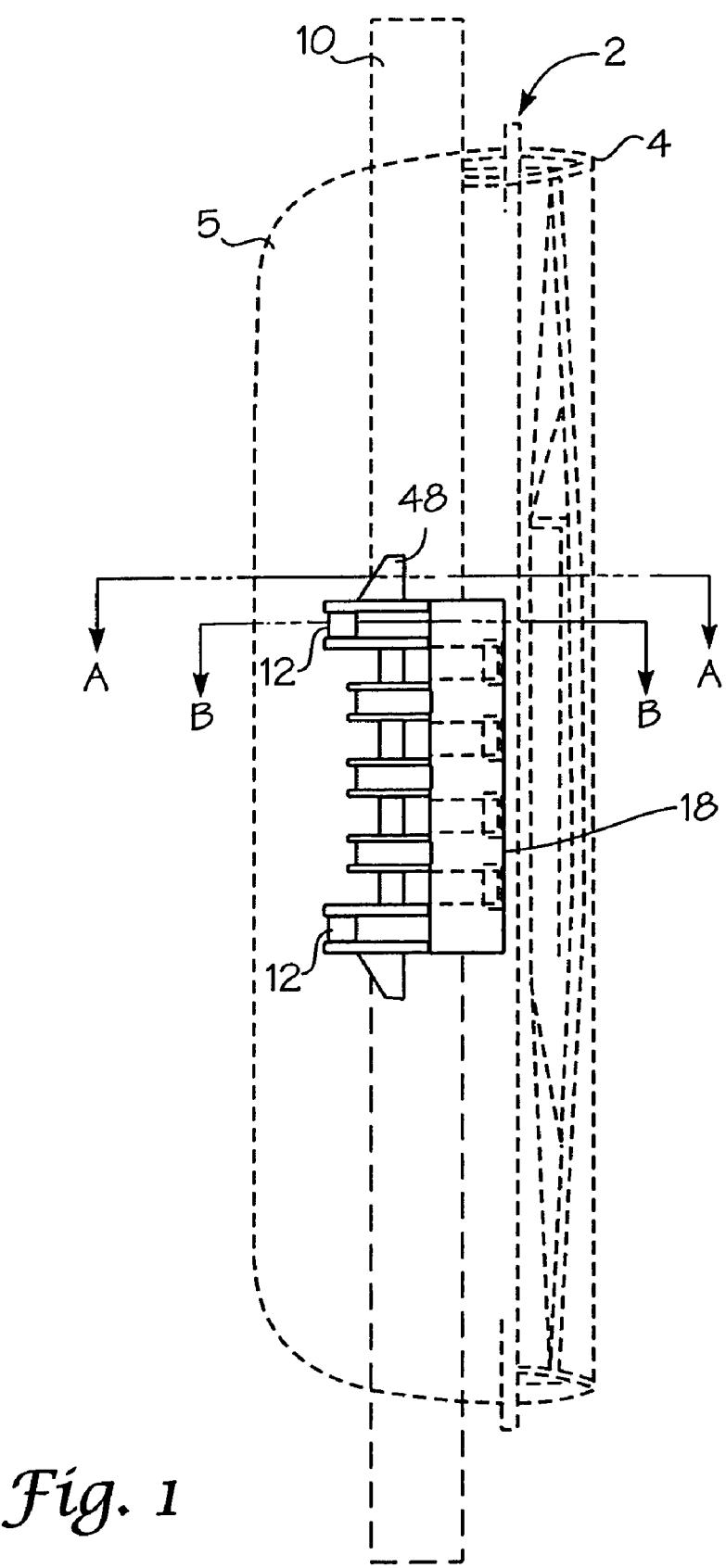
FIG. 1 a side view of a first embodiment of the invention particularly showing a clamping bracket with surrounding elements shown in phantom, FIG. 2 a sectional drawing along the section line A-A of FIG. 1, FIG. 3 a sectional drawing along the section line B-B of FIG. 1, FIG. 4 a plan view of the mirror housing framing seen from the back, FIG. 5 a side view of a second embodiment of the invention particularly showing the clamping bracket with surrounding elements in phantom, and FIG. 6 a sectional view such as in FIG. 3 of a third embodiment of the invention.

Reference will now be made in detail to the presently preferred embodiments of the invention, examples of which are illustrated in the drawings. The examples are provided by way of explanation of the invention and are not intended as limitations of the invention. For example, features illustrated or described as part of one embodiment can be used on another embodiment to yield yet a third embodiment. Accordingly, it is intended that the present invention include such modifications and variations.

The FIGS. 1 to 4 show a first embodiment of the invention in various presentations. FIG. 1 shows a side view, depicting a mirror housing 2, which comprises a mirror housing framing 4 and a mirror housing cover 5. In the mirror housing 2 is placed a mirror element 6. The entire rear view mirror is fastened by means of clamping connector 8 on a holder tube, element or part 10. The clamping connection 8 comprises a first clamping part in the form of the mirror housing framing 4 and a second clamping part in the form of a clamping bracket 12.

Figure 2:
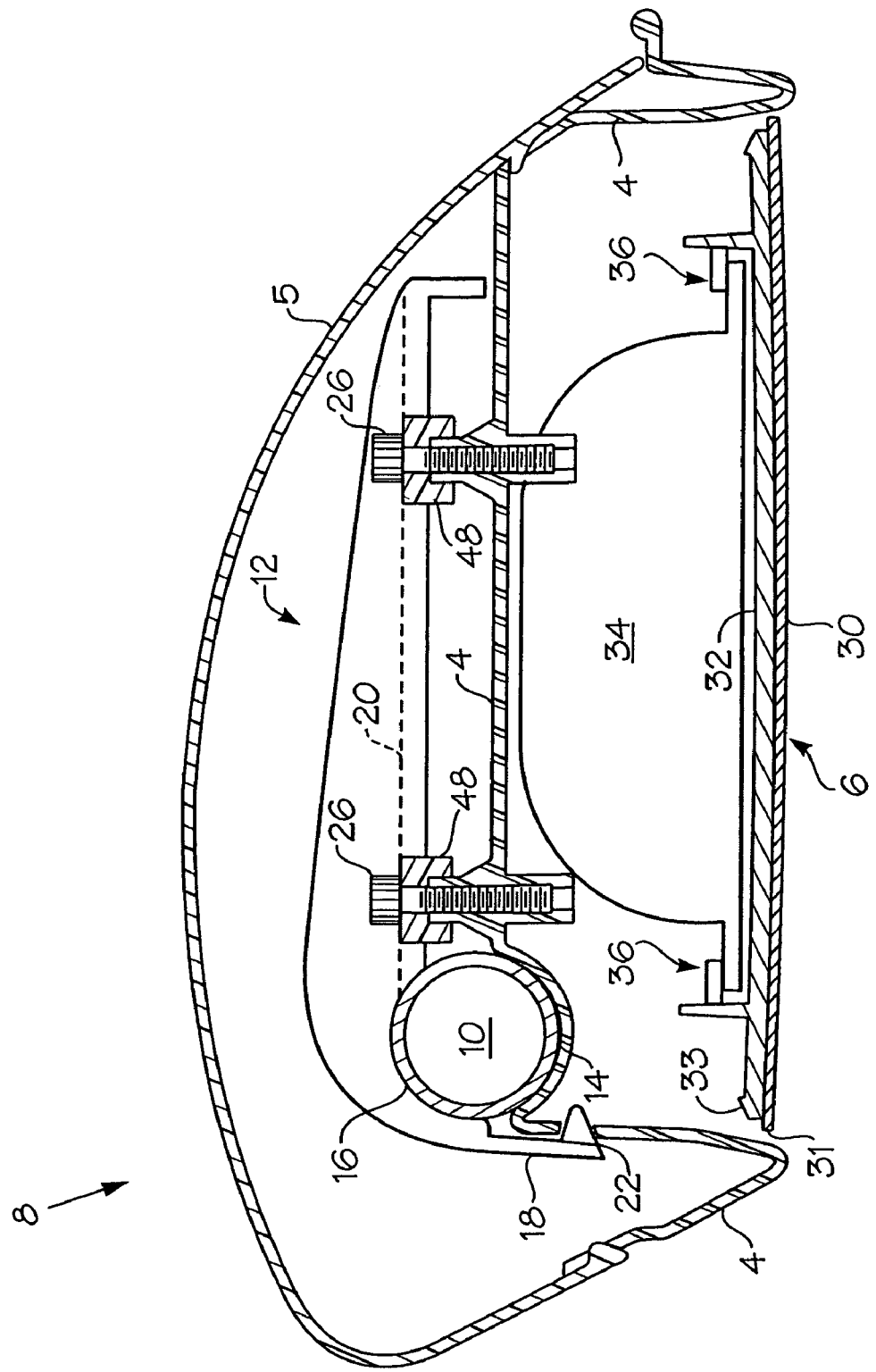
Figure 3:
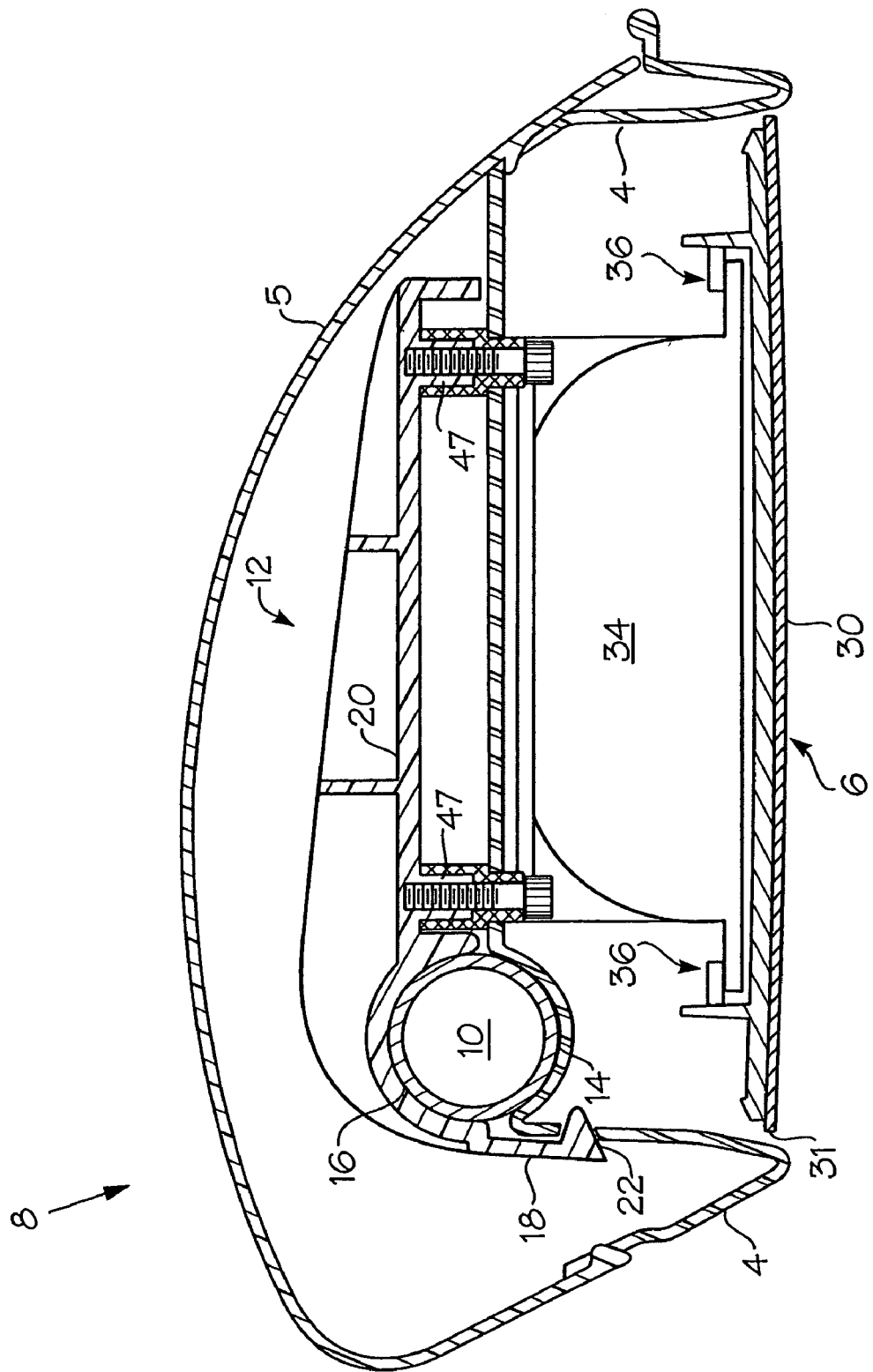

As may be inferred from the sectional drawings in FIGS. 2 and 3, the mirror housing framing 4 is configured forming a trough-like recess 14 within which the holder tube 10 is partially encased. The clamping bracket or part 12 is also configured forming a similar trough-like recess 16. Thus, as a result of the double, opposed trough-like recesses 14, 16, the support element or holder tube 10 is nearly completely circumferentially encased, and a large surface is made available for the transmission of forces. Extending in a first direction from the trough recesses 16 of the bracket 12 are a plurality of hook elements 18 which extend in comb-like fashion. Extending from the other side of the trough recess 16 is part 20 of the bracket 12 with extensions 48 for screw fastenings 26. The hook elements 18 fit into a corresponding hook opening 22 in the mirror housing framing 4. As one can see in FIGS. 2 and 4, the part or arm 20 of the clamping bracket 12 is connected to the mirror housing framing 4 by means of four screw connections 26 which pass through extensions 48 and secure in receptor openings formed in mirror framing 4.

Figure 4:
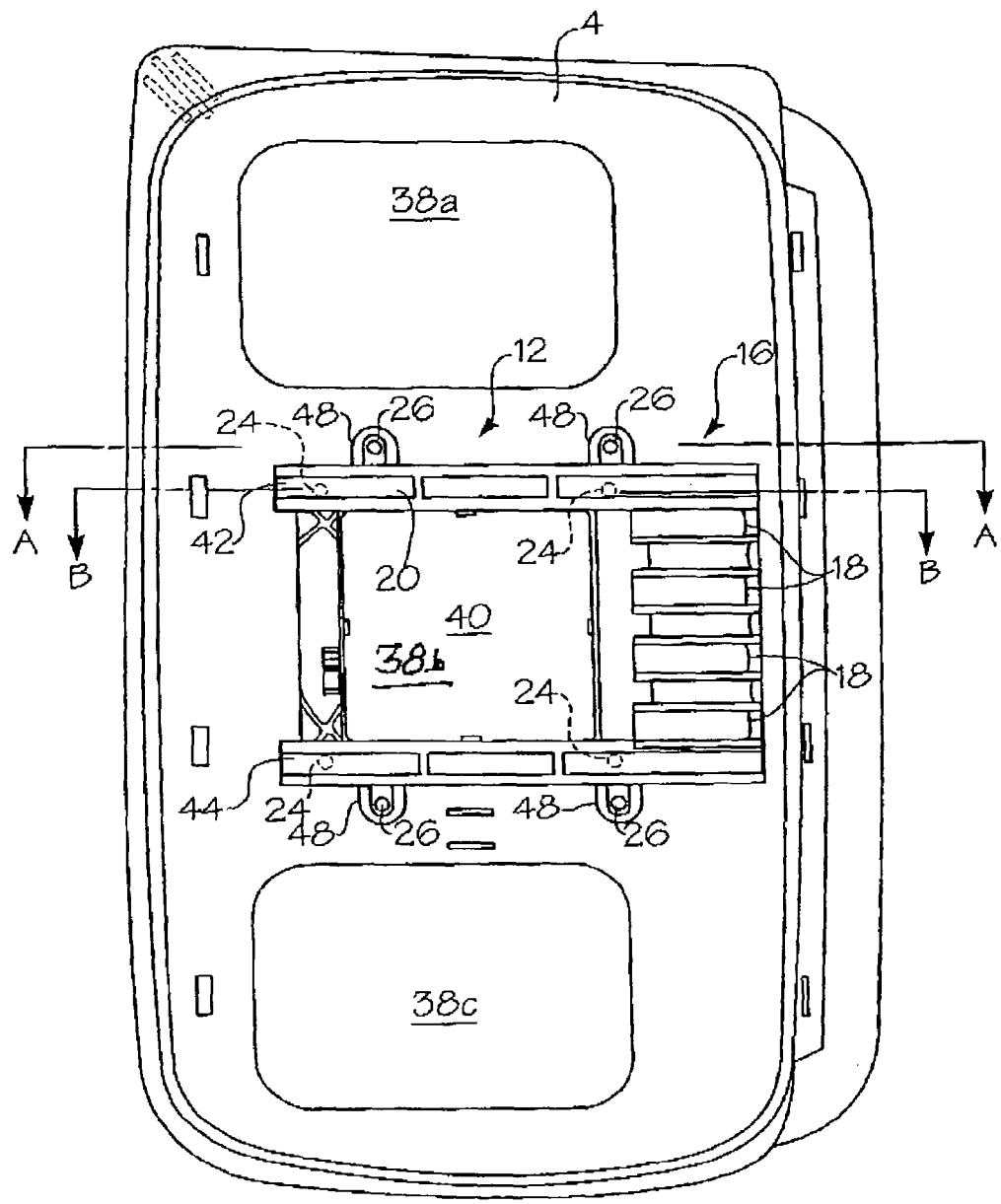

FIGS. 3 and 4 show that the mirror element 6, inclusive of a mirror pane 30, a glass carrier plate 32 and an electric motor driven mirror positioning apparatus 34, is connected to part or arm 20 of the clamping bracket 12. In this way, the mirror adjustment apparatus 34 is fastened onto the part 20 of the clamping bracket 12. To accomplish this, the mirror positioning apparatus 34 is screwed onto the receptor 47 of part or arm 20 of the clamping bracket 12 by means of four screw connections 24.

The four screw connectors or connections 24, i.e. screws, enter the part or arm 20 of the clamping bracket 12 (in FIG. 3) from the side proximal to the mirror pane 30. The glass carrier plate 32, with its attendant mirror pane 30, is fastened onto the mirror positioning apparatus 34 by means of a detent connection 36. The glass carrier plate 32 is without a surrounding rim construction, as discussed in EP 0 659 609 B1, and a periphery 31 of the mirror pane 30 extends slightly outward beyond a periphery 33 of the glass carrier plate 32. To this extent, EP 0 659 609 B1 is incorporated herein by reference.

FIG. 4 shows a view of the mirror housing framing 4 from the front without the mirror element 6. The mirror housing framing 4 possesses three openings 38a, 38b, 38c for internal installation purposes and for weight reduction. The somewhat rectangular clamping bracket 12 exhibits in its screwed-on part or arms 20 an opening 40, which overlaps the central opening 38b (shown in phantom) in the mirror housing framing 4. In the remaining upper and lower edge strips 42, 44, respectively, are provided the four extensions 48 receiving connectors or screws 26 for connecting the clamping bracket 12 with the mirror housing framing 4. On the upper and the lower strips 42, 44 are four screw connectors 24 and four holding arms 47 for the screw connection of the mirror positioning adjustment apparatus 34 to the clamping bracket 12.

When mounting the mirror housing 2, first the clamping bracket 12 is pushed into the snap connections 22 of the mirror housing framing 4. Subsequently, the holding tube 10 is clamped between the clamping bracket 12 and the mirror housing framing 4. The clamping bracket 12 is attached to the mirror housing framing 4 from the back side of the mirror assembly forward by connectors 26 (see FIG. 2). Thereafter, from the front position, the mirror positioning apparatus 34 is screwed onto the openings or receptors 47 of the clamping bracket 12 by screw connectors 24. Following this, the glass carrier plate 32 with the mirror pane 30 is fastened onto the mirror positioning apparatus 34 by means of the detent connections 36. Finally, the mirror housing cover 5 is snapped onto the mirror housing framing 4.

In the case of the embodiment in accord with FIGS. 1-4, the connections, i.e., screw connectors 24 and 26, between first, the mirror housing framing 4 and the clamping bracket 12, and second, the mirror positioning apparatus 34 and the clamping bracket 12, are made by means of two independent sets of connectors or screws 24 and 26 respectively. Alternatively, the mirror positioning apparatus 34, the mirror housing framing 4 and the clamping bracket 12 can also be bound together by a screw connection common to all (not shown).

Figure 5:
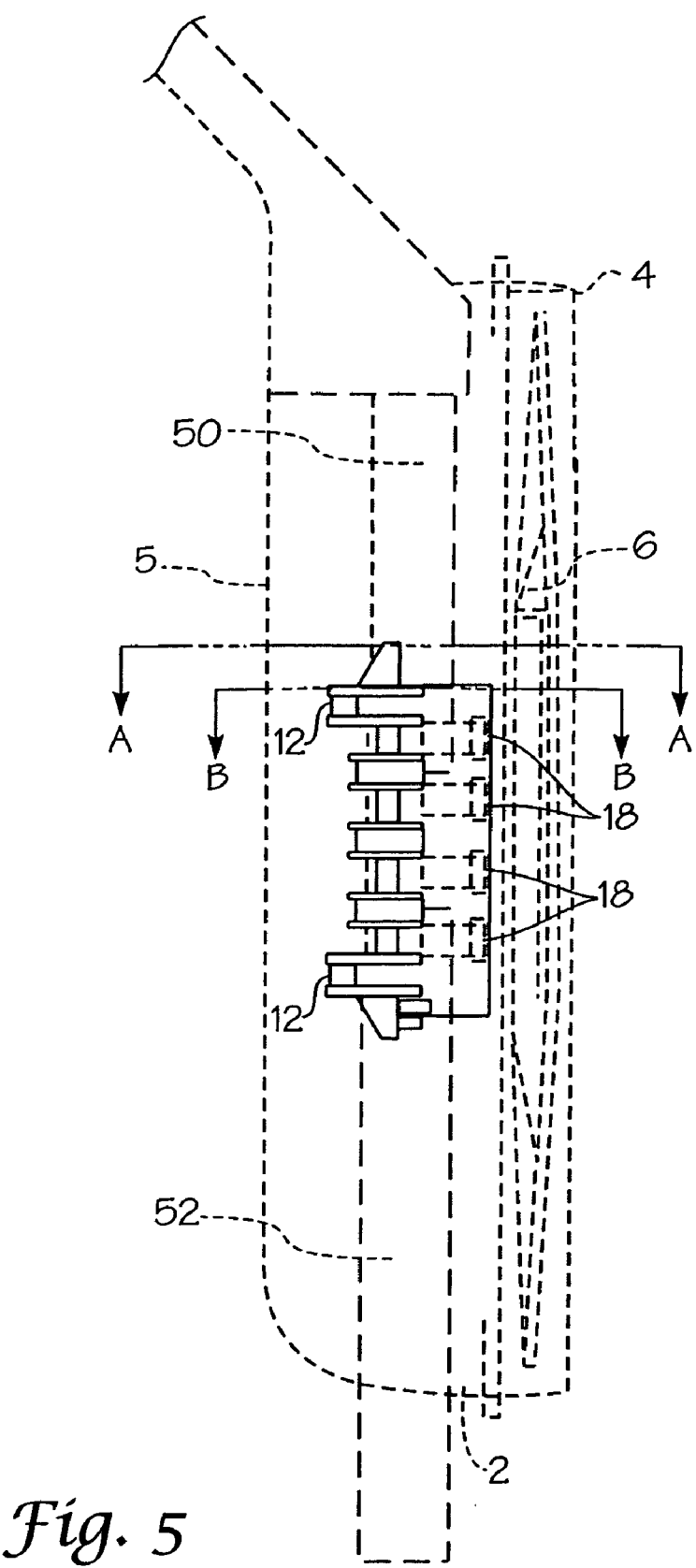

FIG. 5 shows a side view of a second embodiment of the invention similar to the presentation of FIG. 1. This second embodiment of the invention differs from the first embodiment in that the holding element 10 is not a continuous holding tube, but is rather constructed as a two-piece holding component or spaced holding tubes with a first and a second holding arm 50 and 52. In this case, the first holding arm 50 is secured by the upper edge strip 42 of the clamping bracket 12 and the second holding arm 52 is secured by the lower edge strip 44 of the clamping bracket 12. Otherwise, the construction of the second embodiment agrees in all details with the first embodiment.

Figure 6:
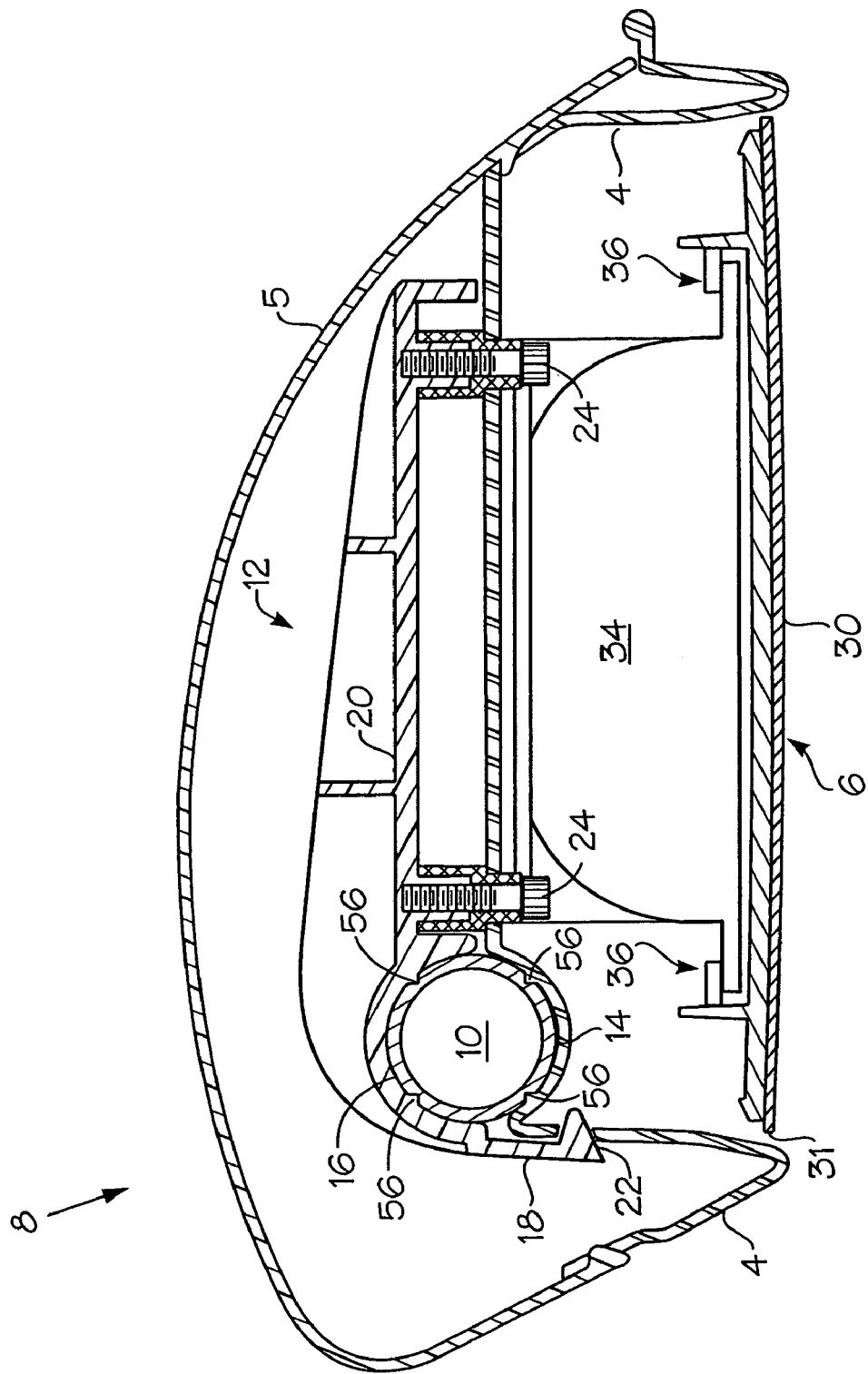

FIG. 6 shows a third embodiment of the invention in a drawing similar to FIG. 3. The third embodiment differs from the first or the second embodiment in that the connection between the holding parts 10, 50, 52 and the clamping bracket 12 are not made as auxiliaries to the clamping connection by means of a form-fit binding. In this case, in the trough—like recesses 14 and 16, additional projections 56 are provided which fit into complementary recesses 58 in the holding parts 10, 50 and 52. By this means, the mirror is secured additionally against rotational displacement on the holding parts 10, 50, 52. Additionally or alternatively, in the holding parts 10, 50, 52, projections can be provided that engage in corresponding recesses in the trough shaped recesses 14 and 16 (not shown).

The mirror housing framing 4 and the mirror housing cover 5 are preferably made of acrylonitrile butadiene styrene (ABS). The clamping bracket 12 preferably is manufactured from glass fiber reinforced plastic, polyamide (PA 6.6) glass fiber (GF 35). For example, the glass carrier plate 32 is advantageously made of ABS with a 30% portion of glass fiber and possesses a thickness in a range between 1 and 1.5 millimeters (nun). The wall thickness of the remaining components varies between 2 and 2.5 mm. By means of these measures, weight and cost reductions are achieved. Furthermore, the vibration tendencies are also reduced.

In certain cases it can also be advantageous to reinforce the trough-shaped recess 14 and the area of the screw connections 24 of the mirror housing framing 4 by means of an inlay of reinforced material (not shown) or to make these areas out of glass fiber reinforced plastic.

It will be apparent to those skilled in the art that various modifications and variations can be made in the present invention without departing from the scope and spirit of the invention. It is intended that the present invention includes such modifications and variations as come within the scope of the appended claims and their equivalents.

Claimed is:

1. A rearview mirror assembly for attachment to a vehicle via a holding tube, the assembly comprising:
    a mirror housing including a framing element defining a first recess configured to attach to the holding tube;
    a clamping bracket defining a second recess configured to attach to the holding tube and disposed opposite of the framing element, the first recess of the framing element and the second recess of the clamping bracket cooperating to encase and clamp with the holding tube and releasably attach to each other;
    the clamping bracket further configured to fastenably hold a mirror element; wherein,
    one of the clamping bracket and the framing element has a hook element and the other one of the clamping bracket and the framing element has a snap connection, the hook element and the snap connection being snap-connectable to secure the framing element and the clamping bracket together.

2. The rearview mirror assembly of claim 1 wherein said clamping bracket is a plastic housing having at least a first opening therethrough and said framing element has at least a second opening therethrough which aligns with said at least first opening, a connector passing through said clamping bracket and said framing element securing said at least a first opening of said clamping bracket and said at least a second opening of said framing element aligned and securing the first and second recesses with said holding tube.

3. A rearview mirror assembly removably attached to a vehicle comprising:
    a holding element carried by said vehicle;
    a mirror element having a mirror pane attached to a carrier plate;
    a positioning apparatus supporting said carrier plate;
    a framing having a configured area engaged with said holding element;
    a bracket, including an upper strip, a lower strip and a configured area, said configured area of said bracket being adjacent said upper strip and said lower strip and engaged with said holding element; and
    a plurality of connectors engaged with each of said positioning apparatus, said framing and said bracket, said connectors securing said framing and said bracket against said holding element and securing said positioning apparatus with said upper and lower strips of said bracket.

4. The mirror assembly of claim 3 wherein said holding element comprises a first arm separated from a second arm and said configured area adjacent said upper strip of said bracket is engaged with said first arm and said configured area adjacent said second strip of said bracket is engaged with said second arm.

5. The mirror assembly of claim 4 wherein said configured area of at least said framing comprises a recess, said recess cooperating with the configured area of said bracket and said upper and lower strips to secure said mirror assembly with said holding element.

6. The mirror assembly of claim 3 wherein said framing and said bracket include a hook and a snap connection, said hook and said snap connection cooperating to secure said framing and said bracket together.

7. The mirror assembly of claim 3 including a housing cover and a hook and hook connectors carried by said housing cover and said framing, said hook and hook connectors securing said housing cover with said framing in position covering said bracket.

8. The rearview mirror assembly of claim 3 wherein, said configured area of said framing includes at least one of a projection and an indentation, and said holding element includes at least one of a projection and an indentation, wherein said projections and indentations inter-engage when said framing and said bracket are secured about said holding element securing said framing and said bracket against rotation.

9. The rearview mirror assembly of claim 3 further comprising a housing cover releasably attached to the framing, the housing cover being made of acrylonitrile butadiene styrene (ABS) and said framing being made of fiberglass reinforced plastic.

10. The rearview mirror assembly of claim 3 wherein the carrier plate is acrylonitrile butadiene styrene (ABS) and 30% fiberglass with a thickness of between one and one and one-half millimeters.

\* \* \* \* \*